(12) United States Patent
Dalton et al.

(10) Patent No.: US 11,449,938 B2
(45) Date of Patent: Sep. 20, 2022

(54) METHODS AND SYSTEMS FOR TRACKING UNSPENT TRANSACTION OUTPUT (UTXO) TOKENS IN A DISTRIBUTED LEDGER TECHNOLOGY-BASED NETWORK

(71) Applicant: PayPal, Inc., San Jose, CA (US)

(72) Inventors: Charles Gabriel Neale Dalton, San Jose, CA (US); Liam Julian DiGregorio, Manhattan Beach, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/132,590

(22) Filed: Dec. 23, 2020

(65) Prior Publication Data

US 2022/0198559 A1 Jun. 23, 2022

(51) Int. Cl.
*G06Q 40/00* (2012.01)
*G06Q 40/04* (2012.01)
(Continued)

(52) U.S. Cl.
CPC ......... *G06Q 40/04* (2013.01); *G06F 16/2255* (2019.01); *G06F 16/2379* (2019.01); *G06F 16/27* (2019.01); *G06Q 20/0655* (2013.01); *G06Q 20/389* (2013.01); *G06Q 20/405* (2013.01); *G06Q 20/3676* (2013.01);
(Continued)

(58) Field of Classification Search
None
See application file for complete search history.

(56) References Cited

U.S. PATENT DOCUMENTS

2017/0317997 A1  11/2017  Smith et al.
2018/0331832 A1  11/2018  Pulsifer
(Continued)

FOREIGN PATENT DOCUMENTS

CN  109863719 A  *  6/2019  ........... G06F 21/645

OTHER PUBLICATIONS

Moser et al. "Effective Cryptocurrency Regulation Through Blacklisting." In: maltemoeser.de, 2019, [online] [retrieved on Apr. 19, 2022 (Apr. 19, 2021)] Retrieved from the Internet< URL: https://maltemoeser.de/>, entire document.

*Primary Examiner* — Olabode Akintola
(74) *Attorney, Agent, or Firm* — Haynes and Boone, LLP

(57) ABSTRACT

Tracking and clawing back unspent transaction output (UTXO) tokens mechanism are disclosed for distributed ledger technology-based networks (DLTNs) operating a UTXO-based token transaction model (which can include blockchain networks). Some embodiments comprise receiving a request to transfer a UTXO token in a DLTN operating a UTXO-based token transaction model. Further, the embodiments can include determining that a clawback list includes the genesis token identifier and barred token identifiers of UTXO tokens barred from being transferred on the DLTN. In addition, the embodiments can include determining whether the clawback list includes any of the ancestral token identifiers of the UTXO token and generating an instruction regulating the transfer of the UTXO token in the DLTN based on the determining whether the clawback list includes any of the ancestral token identifiers. Such techniques improve the security and functionality of DLTNs such as a blockchain network.

20 Claims, 6 Drawing Sheets

(51) Int. Cl.
*G06Q 20/06* (2012.01)
*G06Q 20/38* (2012.01)
*G06Q 20/40* (2012.01)
*G06F 16/27* (2019.01)
*G06F 16/23* (2019.01)
*G06F 16/22* (2019.01)
G06Q 20/36 (2012.01)
H04L 9/32 (2006.01)

(52) U.S. Cl.
CPC ..... *G06Q 20/3678* (2013.01); *G06Q 2220/00* (2013.01); *H04L 9/3213* (2013.01); *H04L 2209/56* (2013.01)

(56) References Cited

U.S. PATENT DOCUMENTS

| | | |
|---|---|---|
| 2019/0057382 A1 | 2/2019 | Wright et al. |
| 2020/0050780 A1 | 2/2020 | Uhr et al. |
| 2020/0234257 A1 | 7/2020 | Mallik et al. |

* cited by examiner

METHODS AND SYSTEMS FOR TRACKING UNSPENT TRANSACTION OUTPUT (UTXO) TOKENS IN A DISTRIBUTED LEDGER TECHNOLOGY-BASED NETWORK

FIELD OF THE INVENTION

The present specification generally relates to distributed ledger technology-based networks (DLTNs) operating unspent transaction output (UTXO)-based token transaction model, and more specifically, to tracking and clawing back UTXO tokens in such DLTNs, according to various embodiments.

BACKGROUND

Distributed ledger-based networks, also known as blockchain networks, utilize transparent and consensus-based verification schemes to validate transactions occurring on the networks. The schemes include verifications of the transactions by at least most of the computing nodes that make up the networks. Each of the computing nodes can keep records of the transactions in a distributed ledger that is extremely difficult to reverse, which allows participants of the networks to at least pseudo-anonymously transact on the networks with confidence about the validity of the transactions. One issue that has arisen with blockchain networks, however, is that their mechanisms do not include typical security and/or access controls found in other electronic transactions, and thus may in some circumstances help facilitate illegal activities by virtue of the anonymity or pseudo-anonymity allowed in transacting.

SUMMARY OF SOME OF THE EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects of the present disclosure disclose a method, comprising: receiving, at a computer system, a request to transfer a first unspent transaction output (UTXO) token in a distributed ledger technology-based network (DLTN) operating a UTXO-based token transaction model. In some embodiments, the first UTXO token may include a first token identifier that uniquely identifies the first UTXO token, and a genesis token identifier that identifies at least one of a genesis UTXO token from which the first UTXO token is descended or a first previous tokens array. In some embodiments, the first previous tokens array may include ancestral token identifiers of a first set of ancestral UTXO tokens that are lineal ancestors of the first UTXO token. In some embodiments, the method further comprises determining, via the computer system and in response to the request, that a clawback list includes the genesis token identifier, the clawback list including barred token identifiers of UTXO tokens barred from being transferred on the DLTN. Further, the method comprises determining, via the computer system and in response to the determining that the clawback list includes the genesis token identifier, whether the clawback list includes any of the ancestral token identifiers of the first previous tokens array. In addition, the method comprises generating, via the computer system, an instruction regulating the transfer of the first UTXO token in the DLTN based on the determining whether the clawback list includes any of the ancestral token identifiers.

Some aspects of the present disclosure disclose a method, comprising: receiving, at a computer system, a request to identify a child of a first unspent transaction output (UTXO) token of a plurality of UTXO tokens in a distributed ledger technology-based network (DLTN) operating a UTXO-based token transaction model. In some embodiments, the first UTXO token includes a first token identifier that uniquely identifies the first UTXO token. In some embodiments, the method comprises performing, via the computer system, a computation using the first token identifier and an index to generate a second token identifier that identifies a second UTXO token. In some embodiments, the method further comprises checking, via the computer system, for either a presence or an absence of the second UTXO token at a memory address of a database configured to store the plurality of UTXO tokens. In some embodiments, the memory address may be associated with the second token identifier. Further, in some embodiments, the method comprises identifying, via the computer system, the second UTXO token as the child of the first UTXO token if the checking indicates the presence of the second UTXO token at the memory address of the database.

Some aspects of the present disclosure disclose a non-transitory computer-readable medium (CRM) having stored thereon computer-readable instructions executable to cause a computer system to perform operations. In some embodiments, the operations comprise receiving, at the computer system, a request to transfer a first unspent transaction output (UTXO) token in a distributed ledger technology-based network (DLTN) operating a UTXO-based token transaction model. In some embodiments, the first UTXO token includes a first token identifier that uniquely identifies the first UTXO token, a genesis token identifier that identifies at least one of a genesis UTXO token from which the first UTXO token is descended or a first previous tokens array. In some embodiments, the first previous tokens array including ancestral token identifiers of a first set of ancestral UTXO tokens that are lineal ancestors of the first UTXO token. Further, operations comprise determining, via the computer system and in response to the request, that a clawback list includes the genesis token identifier, the clawback list including barred token identifiers of UTXO tokens barred from being transferred on the DLTN. The operations further comprise determining, via the computer system and in response to the determining that the clawback list includes the genesis token identifier, whether the clawback list includes any of the ancestral token identifiers of the first previous tokens array. In addition, the operations comprise generating, via the computer system, an instruction regulating the transfer of the first UTXO token in the DLTN based on the determining whether the clawback list includes any of the ancestral token identifiers.

Figure 1:
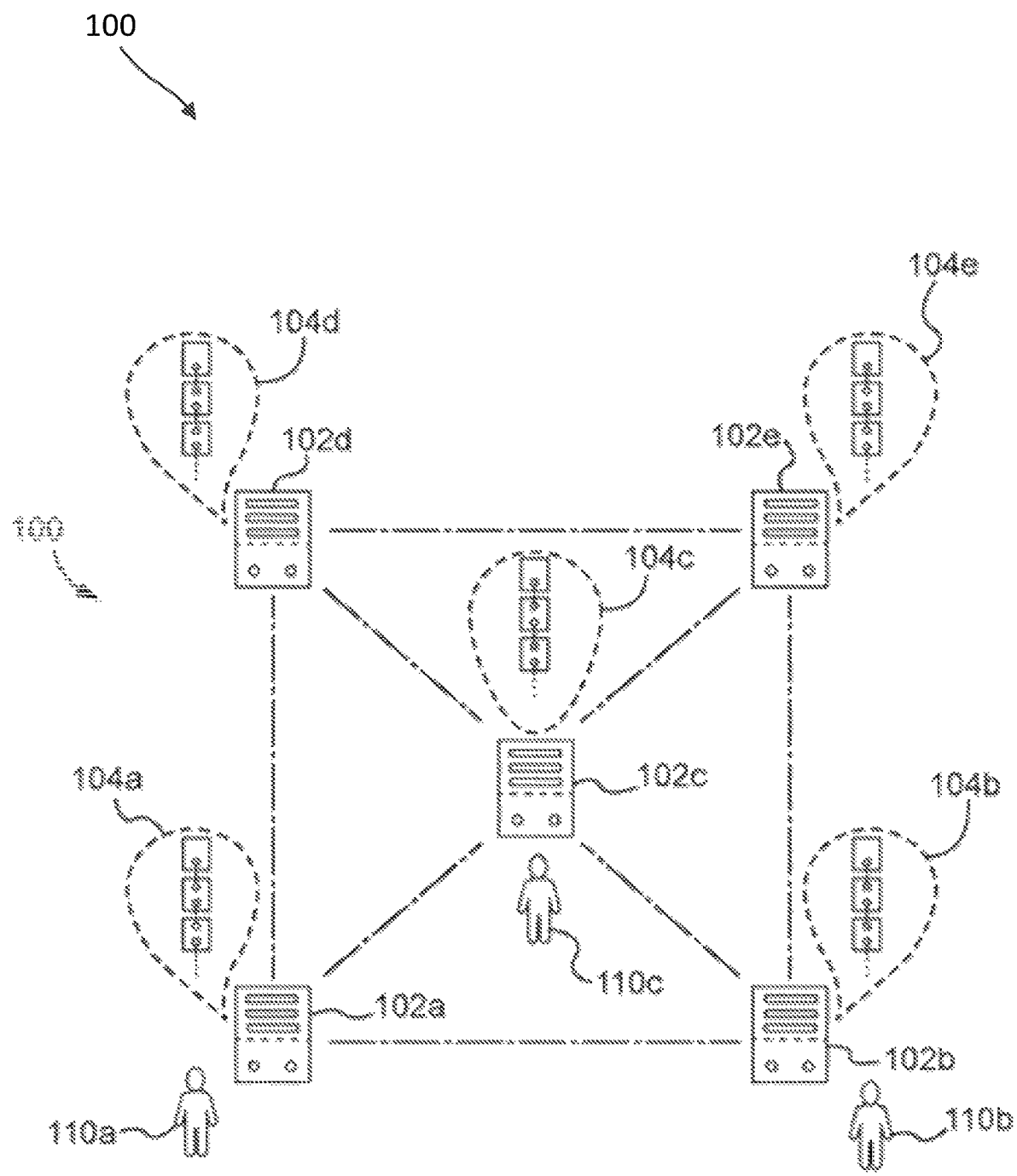
FIG. 1 is a schematic illustration of a distributed ledger technology-based network (DLTN) system, according to various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

In some embodiments, the present disclosure pertains to methods and systems for tracking and, in some cases clawing back, tokens in a distributed ledger technology-based network (DLTN) operating an unspent transaction output (UTXO) token transaction model. Claw back of a token (which may represent a quantity of cryptocurrency or another type of digital asset) may include confiscation of a token by an entity, restricting transfer of the token, and/or otherwise removing those tokens from circulation on a DLTN, in various embodiments. In some instances, a DLTN can be or support a blockchain network. In some embodiments, a DLTN may comprise multiple computing nodes communicating with each other via a peer-to-peer communication system about transactions occurring on the DLTN. In some cases, transactions can be facilitated on DLTNs by so-called smart contracts, or types of programs which can be deployed on DLTNs. In some cases, the smart contracts may execute when triggered to do so by participants of the transactions (e.g., a participant of a transaction may authorize the transfer of tokens from an account on the DLTN of the participant to an account of another participant). In some cases, most or all computing nodes that make up a DLTN may include a copy of the smart contract, which may communicate with each other about the transactions occurring on the DLTN. The computing nodes also contain distributed ledgers, and transactions occurring on the DLTN are recognized as valid when at least most of the computing nodes accept the validity of the transactions and record the details thereof on their respective distributed ledgers. Transfers on a DLTN, of course, may also be accomplished without the use of smart contracts according to various embodiments.

As an example illustration, a first user of a DLTN can use a first computing node of the DLTN to authorize the transfer of a number of tokens to an account or wallet belonging to a second user of the DLTN (e.g., corresponding to a second computing node of the DLTN), and in such cases, the first user on the DLTN may initiate the process of transferring the number of tokens from the first account or wallet of the first participant to second account or wallet. In such cases, the nodes may initially verify that the first account holds at least a number of tokens no less than the number of tokens authorized to be transferred, debit the authorized number of tokens from the first account and credit the same or less (e.g., due to transaction fees, transfer fees, etc.) number of tokens to the second account. The computing node may then communicate the details of the transaction with the other computing nodes so at least a substantial number of the nodes can come to the same state. When a computing node of the DLTN accepts the transfer of the tokens as a valid transaction, the computing node may record the details of the transfer in its copy of the distributed ledger, and the transfer may be deemed to be a valid transaction on the DLTN when most or all computing nodes record the details of the transfer in their respective distributed ledgers. In some embodiments, the users may not be associated with a particular computing node but rather may engage with any computing node of the computing nodes of the DLTN to execute a transaction. For example, the users may treat the computing nodes as black boxes and send transactions to any of the computing nodes, which then execute the transactions based on pre-defined rules or codes of their runtime.

In some embodiments, the accounting details (e.g., debiting, crediting, etc.) of transactions occurring on a DLTN or blockchain may depend on the transaction model of the DLTN, i.e., on the type of transaction system that the DLTN is (e.g., whether it is an "account-based" system or "token-based" system). In some embodiments, a DLTN may be an account-based system that operates an account-based transaction model, where an account or wallet on the DLTN may have an associated "account balance" of units of value. In such cases, the stored units of value can be fungible, i.e., any one unit in the account may be indistinguishable from any other unit in the account and the account balance represents the total sum of the indistinguishable units of value stored in the account. In such cases, the transfer of an authorized number of units of value from a first account to a second account on the DLTN comprises reducing the account balance in the first account by the authorized number units of value and increasing the account balance in the second account by the same or less (e.g., due to transaction, fees, transfer fees, etc.) number of units of value. For example, if a first account has an account balance of ten units in a first account in the DLTN and the owner of the first account authorizes the transfer of eight units to a second account, the transfer includes the steps of decrementing eight units from the account balance of the first account and increasing the account balance of the second account by eight units, without having to distinguish or determine "which eight units of the ten units" in the first account are transferred to the second account.

In some embodiments, an account-based transaction model, however, may not facilitate the tracking, and if needed, clawing back, of units of value transferred between accounts on a DLTN. For example, the units of value on the DLTN may be issued by a token issuer or administrator that wishes or is obligated (e.g., by legal authorities to combat or prevent the use of the tokens to commit crimes on the DLTN) to regulate transactions on the DLTN that use the units of value. For instance, the units of value may have been transferred from one account to another as part of an illicit transaction and the administrator may wish to track and freeze/clawback the tainted units of value. In such cases, because the account-based transaction model allows the commingling of units of value in an account, identifying and tracking the tainted units of value can be challenging or even impossible, in particular when the tainted units of value propagate throughout multiple accounts on the DLTN as part of multiple transactions.

As an example illustration, an owner of a first account on a DLTN may transfer six units of value from the first account to a second account as part of a transaction that is determined or declared to be illicit by the token administrator. The second account may already have stored therein ten units of value, and the owner of the second account may make two transfers, for eight units of value each, to two different third and fourth accounts on the DLTN. In such cases, because the six tainted units of value were commingled in the second account with the ten units of value that were already present, the administrator may not be able to determine which of the total sixteen units of value transferred to the third and fourth accounts originated in the first account as part of the illicit transaction, frustrating the administrator's ability to regulate transactions occurring on the DLTN involving the administrator-issued units of value. Such an account-based model is not the only possible model however, as discussed below.

In some embodiments, a DLTN or blockchain may use the so-called unspent transaction output (UTXO) token transaction model. In such cases, an account on a DLTN may contain tokens that may be distinguishable from each other. For instance, tokens can be distinguishable based on their face value. As an illustrative example, an account on a DLTN operating a UTXO token transaction model may have stored therein a collection of UTXO tokens (i.e., tokens managed or transacted in the DLTN according to the UTXO transaction model) having different face values, including two UTXO tokens with a face value of five units, a 7-unit UTXO token and a half-unit UTXO token. In such cases, the account can be deemed to have an aggregate value of 2×5+7+0.5 units=17.5 units of UTXO tokens, but not an "account balance" in the sense of the term as discussed above with respect to the account-based model discussed above. This is because the UTXO tokens can be distinguishable (e.g., based on their face values) and as such the aggregate value may not represent the total sum of indistinguishable tokens. For instance, an owner of an account storing the UTXO tokens of the above example and wishing to transfer eight units of UTXO tokens to another account may achieve the owner's goal by transferring either the two 5-unit UTXO tokens and receiving a 3-unit UTXO token change or one of the 5-unit UTXO token and the 7-unit UTXO token and receiving a 4-unit UTXO change. In some cases, instead of transferring a pair of UTXO tokens and receiving a change, the pair of UTXO tokens may be deleted and in their place another pair of UTXO tokens with a face value equaling 8 units and the change may be created (e.g., and then the 8-unit UTXO token can be transferred to the second account). In other words, in contrast to account-based token transaction models, a transfer of eight units of UTXO tokens from a first account on the DLTN to a second account may not be accomplished by simply decrementing eight units of UTXO tokens from the aggregate value of the first account and increasing the aggregate value of the second account by the same or less units of UTXO tokens.

In some embodiments, the use of a UTXO token transaction model by a DLTN may allow a token administrator to track and freeze/clawback tainted UTXO tokens (e.g., UTXO tokens used in an illicit transaction on a DLTN). That is, because UTXO tokens are non-fungible in various embodiments, a token administrator may be able to distinguish tainted UTXO tokens from untainted UTXO tokens (i.e., tokens not identified or determined to have been used in an illicit transaction). For example, with reference to the example above, the owner of the first account on the DLTN may transfer, as part of a transaction that is determined or declared to be illicit by the token administrator, six UTXO tokens from the first account to a second account that may already have stored therein ten UTXO tokens. In such cases, because the UTXO tokens are non-fungible, the UTXO tokens may not be commingled in the second account. For instance, if the owner of the second token authorizes a pair of transfers, each for eight tokens, to two different third and fourth accounts on the DLTN, then an entity tasked with tracking the transfers (e.g., such as the UTXO token administrator) may be able to determine which eight UTXO tokens of the total sixteen UTXO tokens comprising six tainted UTXO tokens and ten untainted UTXO tokens were transferred to either the third account or the fourth account.

In some cases, such ability to track UTXO tokens as the UTXO tokens propagate through the DLTN accounts may allow the UTXO tokens administrator to regulate transactions occurring on the DLTN involving the administrator-issued UTXO tokens (e.g., because the administrator can freeze the tainted tokens or include identifiers of the tainted tokens in a list containing prohibited UTXO tokens).

FIG. 1 is a schematic illustration of a distributed ledger technology-based network (DLTN) system, according to various aspects of the present disclosure. In some embodiments, the DLTN or blockchain network 100 may include multiple computing nodes 102a-102e configured to communicate among each other via a peer-to-peer (P2P) connection. In some implementations, the computing nodes 102a-102e can be computing devices including but not limited to computers, servers, processors, data/information processing machines or systems, and/or the like, and may include data storage systems such as databases, memories (volatile and/or non-volatile), etc. In some implementations, the P2P connections may be provided by wired and/or wireless communications systems or networks (not shown) such as but not limited to the internet, intranet, local area networks (LANs), wide area networks (WANs), etc., utilizing wireless communication protocols or standards such as WiFi®, LTE®, WiMAX®, new radio or 5G communication links, and/or the like. In some embodiments, the DLTN 100 may be a public blockchain network, i.e., there may be no central authority regulating activities or transactions occurring on the DLTN 100 and an activity or a transaction may be recognized as having occurred when the activity or transaction is recorded in the distributed ledgers of the DLTN 100 based on a consensus-based verification mechanism as discussed below. In some embodiments, the DLTN 100 may be a private blockchain network, i.e., the DLTN 100 may be administered by a central authority. In such cases, the DLTN 100 may still employ a consensus-based verification mechanism to verify the validity of transactions (e.g., in addition to or instead of the central authority performing the verifications).

In some embodiments, the DLTN 100 may include smart contracts that are configured to execute when a pre-condition of a transaction for their execution is met. In some cases, the smart contracts may be self-executing or may execute when triggered by a participant of the transaction. For instance, as discussed above, participants of the DLTN 100 (e.g., a sender and a receiver of tokens (e.g., UTXO tokens)) may be engaged in a transaction including the exchange of a product or a service for payment in the form of the UTXO tokens, and the smart contract may be configured to self-execute to initiate the transfer of the UTXO tokens from the buyer's account on the DLTN to the seller's account on the DLTN when the smart contract receives an indication that the pre-condition for the transfer of the UTXO tokens, the sale of the product or the service, has been fulfilled or met. The indication can be, for example, a message from an external data source or oracle indicating to the smart contract that the pre-condition has been met (e.g., an indication that the seller has shipped or delivered the purchased product or service) in response to a call from the smart contract. In another example, the indication can be an authorization from the buyer authorizing the smart contract to transfer the UTXO tokens from the buyer account to that of the seller. In some embodiments, some or all of the computing nodes 102a-102e may include copies of the smart contract and the computing nodes 102a-102e may be configured to communicate with each other about the results of the executions of their respective smart contracts, for example, to arrive at a consensus on the results. In some implementations, results from one or a few of the smart contracts of the computing nodes 102a-102e may be transmitted to the rest of the computing nodes 102a-102e for confirmation.

In some embodiments, the consensus-based verification mechanism includes one or more of the computing nodes 102a-102e sharing details of the transactions executed by their respective smart contracts with other computing nodes for verification by the other computing nodes. In some embodiments, at least a substantial number of the computing nodes 102a-102e may include copies of distributed ledgers 104a-104e, and details of the transactions may be recorded on the distributed ledgers 104a-104e when a substantial proportion of the computing nodes 102a-102e, or a subset thereof, agree on the validity of the details of the transactions. For example, with reference to the example above, a smart contract executing on a computing node 102a of the DLTN 100 may facilitate the transfer of a given number of UTXO tokens from a first account on the DLTN 100 to a second account on the DLTN 100 and share the details of the transaction with the smart contracts executing on the other computing nodes 102b-102e. Examples of the transaction details include amounts of UTXO tokens in the first and second accounts prior to and after the token transfer, account information of the first and the second accounts, etc.

In some embodiments, computing nodes 102b-102e, and/or smart contracts executing thereon, that verify the validity of the transaction details may record on their respective distributed ledgers 104b-104e the transaction details. In some cases, the transaction may be considered or deemed to have occurred on the DLTN 100 when at least a substantial proportion of the computing nodes 102a-102e verify and record the transaction details on their respective distributed ledgers 104a-104e. In some embodiments, the distributed ledger 104a-104e can be immutable or nearly immutable in the sense that to alter the distributed ledger 104a-104e, at least a substantial proportion of the computing nodes 102a-102e would have to agree, which can be increasingly difficult when the number of computing nodes 102a-102e is large (and the distributed ledger 104a-104e gets longer as details of transactions are added onto them).

In some embodiments, UTXO tokens may be stored off-chain, i.e., in databases or storage systems that are not part of the DLTN 100 (e.g., but linked or coupled to the DLTN 100). For instance, if the DLTN 100 is the Ethereum blockchain network, the UTXO tokens may be stored in the Swarm database. In some embodiments, the tokens may be stored on the DLTN 100 (e.g., in the storage systems associated with the computing nodes 102a-102e).

In some embodiments, the UTXO tokens in a DLTN 100 can be stablecoins. That is, the value of a UTXO token that is a stablecoin may be pegged to, and backed by, a reserve asset such as but not limited to fiat money, cryptocurrencies, commodities, or combinations thereof. For example, a single UTXO token with assigned value of one unit may be pegged to and backed by some amount of US dollar, bitcoin cryptocurrency, gold, etc. In some cases, stablecoins can be advantageous as they are likely to have low price volatility because of being pegged to and backed by reserve assets.

In some embodiments, UTXO tokens and/or metadata used for tracking the UTXO tokens (e.g., token identifiers) may be stored in a UTXO HashMap where an UTXO token identifier of an UTXO token may be uniquely associated with the memory address of the memory or storage system where the UTXO token identifier may be listed. For instance, if a UTXO token has an alphanumeric identifier 0x89, the UTXO token may be stored in the memory at the memory address "0x89". In some cases, the use of a HashMap to store UTXO tokens may be advantageous in reducing processing time in the DLTN, because to look up a UTXO token, a computing node of a DLTN may not have to iterate through the memory storing all the UTXO tokens of the DLTN, but rather directly refer to the memory address corresponding to the UTXO token identifier of that UTXO token.

Figure 2A:
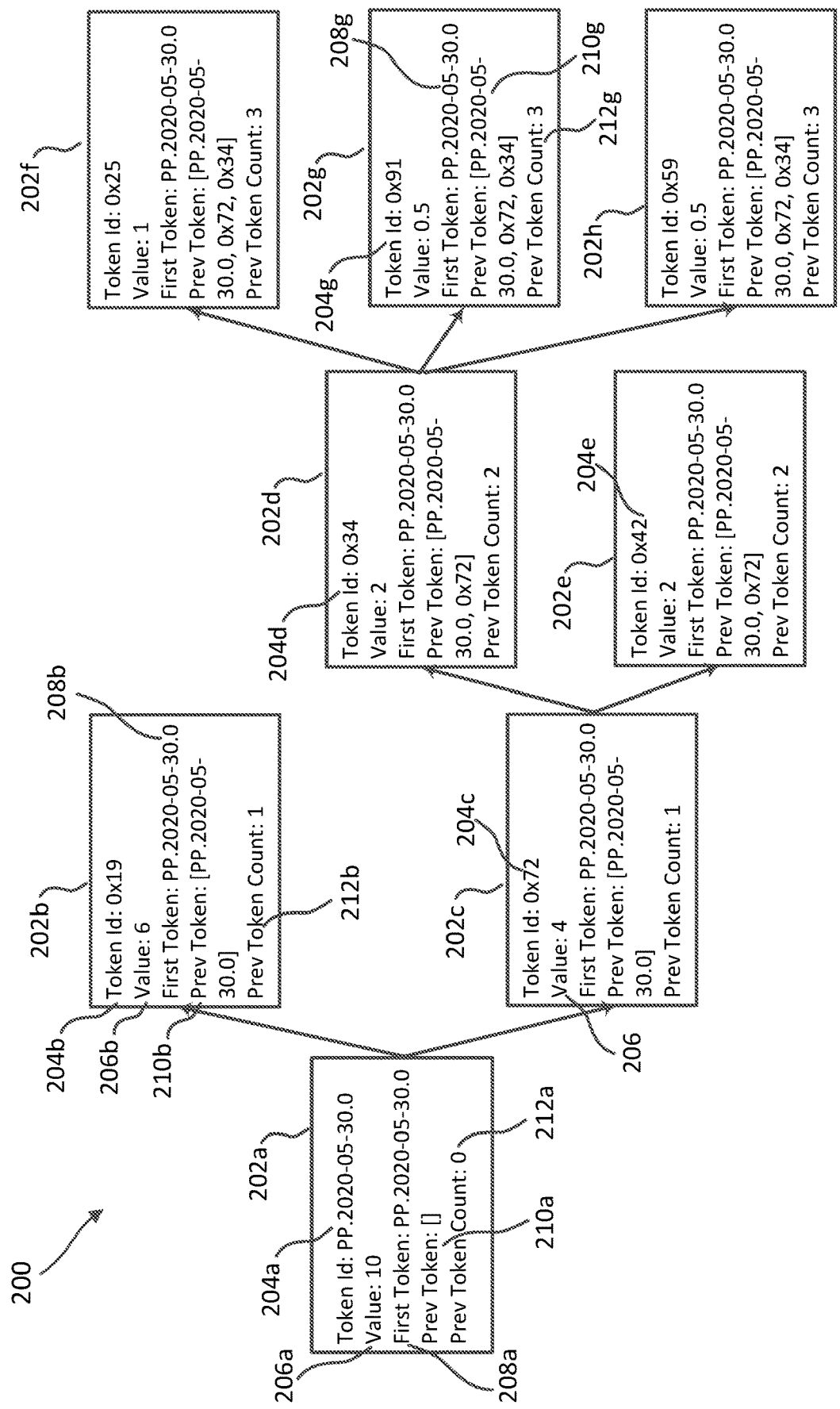
FIGS. 2A-B are example illustrations of an unspent transaction output (UTXO)-based transaction model for a DLTN, according to various aspects of the present disclosure.

FIG. 2A is an example illustration of an unspent transaction output (UTXO)-based transaction model for a DLTN, according to various aspects of the present disclosure. In some embodiments, a DLTN (e.g., such as DLTN 100) may use a UTXO transaction model for transaction occurring on the DLTN, i.e., the tokens transferred from one account to another on the DLTN as part of transactions (e.g., as payments) may be UTXO tokens. FIG. 2A shows example data structures of UTXO tokens 202a-202h that allow a UTXO token issuer or administrator to track and regulate the exchange of the UTXO tokens on the DLTN. In some embodiments, a UTXO token issuer or administrator may issue a first or genesis token 202a that spawns the family of UTXO tokens 202a-202h as discussed below. The genesis UTXO token 202a may include a genesis token identifier 204a uniquely identifying the genesis UTXO token 202a on the DLTN, a genesis UTXO token amount indicator 206a indicating the value of the genesis UTXO token 202a, a first token identifier 208a identifying the first token of the family of UTXO tokens 202a-202h, a previous-tokens array 210a listing the identifiers of ancestral UTXO tokens that preceded the genesis UTXO token 202a, i.e., the identifiers of UTXO tokens that existed in the ancestral line from the first UTXO token of the family of UTXO tokens 202a-202h to the genesis UTXO token 202a, and a previous-tokens count indicator 212a indicating the number of the ancestral UTXO tokens since the start of the family of UTXO tokens 202a-202h. For the genesis UTXO token 202a, in some cases, the first token identifier 208a is same as the genesis token identifier 204a, the previous-tokens array 210a may be empty and the previous-tokens count indicator 212a indicates a value of zero, all because the genesis UTXO token 202a is the first UTXO token of the family. In some embodiments, UTXO tokens that are in the ancestral line from a genesis UTXO token to a given UTXO token may also be referred as the lineal ancestors of the given UTXO token (e.g., the term "lineal ancestors" may also include the genesis UTXO token).

In some embodiments, a participant of the DLTN owning the genesis UTXO token 202a in his/her DLTN account may wish to break the genesis UTXO token 202a into UTXO tokens with less value than that of the genesis UTXO token 202a. For example, the participant may wish to transfer a portion of the genesis UTXO token 202a to another DLTN account as a payment for a purchased product or service, and in such cases, the genesis UTXO token 202a may be partitioned or split into lesser valued UTXO tokens (e.g., child UTXO tokens 202b, 202c), initiating the generation of the family of UTXO tokens 202a-202h. In some embodiments, the term "child UTXO token" may be understood to mean as a UTXO token that is generated from an existing UTXO token using the child UTXO token generation process discussed below. Further, in some embodiments, the terms "partitioning" or "splitting" a UTXO token may be understood as the process of generating multiple child UTXO tokens from a single UTXO token using the child UTXO token generation process. In such cases, the total aggregate value of the child UTXO tokens may be same as the value of the single UTXO token (i.e., the "parent" UTXO token) and the parent UTXO token may be deactivated or rendered invalid or expired on the DLTN so that no token value is created or destroyed on the DLTN as a result of the UTXO token partitioning or splitting process (i.e., token value is conserved on the DLTN).

FIG. 2A shows an example embodiment where the genesis UTXO token with a value of 10 (e.g., in some arbitrary unit) is partitioned into two child UTXO tokens 202b, 202c having a value of 6 and 4, respectively. In some embodiments, the child UTXO tokens 202b, 202c may have same data structure as that of the genesis UTXO token 202a discussed above. That is, for example, child UTXO token 202b may include a child token identifier 204b uniquely identifying the child UTXO token 202b on the DLTN, a child UTXO token amount indicator 206b indicating the value of the child UTXO token 202b, a first token identifier 208b identifying the first token of the family of UTXO tokens 202a-202h, a previous-tokens array 210b listing the identifiers of the ancestral UTXO tokens that preceded the child UTXO token 202b and a previous-tokens count indicator 212b indicating the number of ancestral UTXO tokens since the start of the family of UTXO tokens 202a-202h. Other child UTXO tokens, such as child UTXO token 202c that is a child of the genesis UTXO token 202a, child UTXO tokens 202d, 202e that are children of the UTXO token 202c, child UTXO tokens 202f, 202g, 202h that are children of the UTXO token 202d, etc., may each have a data structure same or substantially similar as discussed above with respect to child UTXO token 202b. Although the child UTXO token generation process is illustrated below with reference to the generation of child UTXO token 202b from its parent UTXO token, i.e., the genesis UTXO token 202a, in some cases, the same process can be applied to generate any child UTXO token.

In some embodiments, the process of generating multiple child UTXO tokens from a parent UTXO token may include the computation of child token identifiers based on the token identifier of the parent UTXO token. That is, in some embodiments, a child token identifier that uniquely identifies a child UTXO token on a DLTN may be computed based on the token identifier of the parent UTXO token of the child UTXO token. For example, the child token identifier 204b that uniquely identifies the child UTXO token 202b on the DLTN may be computed based the token identifier of the parent UTXO token, i.e., the genesis token identifier 204a of the genesis UTXO token 202a. For instance, a hashing algorithm that intakes as an input, among other things, the parent token identifier may be used to compute the child token identifier that uniquely identifies the child UTXO token on the DLTN. In some cases, when generating child token identifiers for child UTXO tokens of the same parent UTXO token, the hashing algorithm may also intake as an input a unique index so that different child UTXO tokens corresponding to different indices may have different (and unique) child token identifiers. Expressed mathematically, the child token identifier $Token\_ID_{child}=H(Token\_ID_{parent}, index)$, where H is a hashing function or algorithm and index is, for instance, an alphanumeric value unique to the child UTXO token (e.g., unique compared to the other child UTXO tokens of the same parent UTXO token) and selected from an index list (e.g., a list of whole or natural numbers, a list of distinct alphanumeric values, etc.). For example, the child token identifier 204b of child UTXO token 202b may be computed using the equation H(PP.2020-05-30.0, 0)=0x19, where index=0 is associated with child UTXO token 202b and is selected from an index list of whole numbers. In some cases, the child token identifiers of other child UTXO tokens of the same parent token may be computed similarly but with different indices. For example, the child token identifier 204c of child UTXO token 202c that is a child of the same parent UTXO token 202a may be computed as H(PP.2020-05-30.0, 1)=0x72, where index=1 is associated with child UTXO token 202c. In such cases, child token identifiers of additional child UTXO tokens (e.g., of the same parent UTXO token) may be computed using the same equation as above but with index=2, 3, . . . . Although the discussion above about computing child token identifiers of child UTXO tokens of a given parent UTXO token is presented with respect to parent UTXO token 202a (and child UTXO tokens 202b, 202c), in some embodiments, the discussion equally applies to all other parent and child UTXO tokens in the DLTN (e.g., parent UTXO token 202c and child UTXO tokens 202d, 202e, or parent UTXO token 202d and child UTXO tokens 202f, 202g, 202h).

In some embodiments, the process of generating multiple child UTXO tokens by partitioning a parent UTXO token on a DLTN may include verifying that the total aggregate value of the child UTXO tokens is equal to the value of the parent UTXO token and deactivating or invalidating the parent UTXO token on the DLTN so that no new or additional token value is introduced on the DLTN as a result of the partitioning of the parent UTXO token. For example, FIG. 2A shows an example generation of child UTXO tokens 202b, 202c by partitioning the genesis UTXO token 202a into two. In such cases, the total aggregate value of the child UTXO tokens 202b and 202c, i.e., the sum of the values indicated by the child UTXO token amount indicators 206b and 206c may be equal to the value indicated by the genesis UTXO token amount indicator 206a. Further, with the generation of the child UTXO tokens 202b and 202c on the DLTN, the parent UTXO token, i.e., the genesis UTXO token 202a, may be rendered invalid or expired. Although the discussion above about verifying that the total aggregate value of child UTXO tokens is equal to the value of the parent UTXO token is presented with respect to parent UTXO token 202a (and child UTXO tokens 202b, 202c), in some embodiments, the discussion equally applies to all other parent and child UTXO tokens in the DLTN. For example, the value indicated by the UTXO token amount indicator of parent UTXO token 202c is equal to the sum of the values indicated by the UTXO token amount indicators of child UTXO tokens 202d, 202e. As another example, the value indicated by the UTXO token amount indicator of parent UTXO token 202d is equal to the sum of the values indicated by the UTXO token amount indicators of child UTXO tokens 202f, 202g, 202h.

In some embodiments, the data structure of a child UTXO token generated from a parent UTXO token may include information or data related to or identifying the UTXO tokens that preceded the child UTXO token in the ancestral line from the genesis UTXO token to the child UTXO token. For instance, FIG. 2A shows example child UTXO token 202g (e.g., a child of the parent UTXO token 202d) that is a descendant of the ancestral UTXO tokens 202a, 202c, 202d that preceded it along the ancestral line connecting the genesis UTXO token 202a to the child UTXO token 202g (i.e., UTXO token 202g is generated from UTXO token 202d, which in turn is generated from UTXO token 202c, which in turn is generated from the genesis UTXO token 202a). In such cases, when generating the child UTXO token 202g from the parent UTXO token 202d, the data structure of the child UTXO token 202g may include information or data related to or identifying each of the ancestral UTXO tokens 202a, 202c, 202d. For example, the child UTXO token 202g may include a previous-tokens array 210g listing the token identifiers of the ancestral UTXO tokens 202a, 202c, 202d (e.g., [PP.2020-05-30.0, 0x72, 0x34] as shown in FIG. 2A).

In some embodiments, the previous-tokens array of a UTXO token may not include information or data (e.g., such as UTXO token identifiers) of all the ancestral UTXO tokens from a genesis UTXO token to that UTXO token. For instance, the previous-tokens array may include information or data about a limited number of the most recent ancestral UTXO tokens (e.g., less than the number of all the ancestral UTXO tokens). For example, the previous-tokens array in the data structure of a UTXO token may include the UTXO token identifiers of no more than the most recent thirty-two ancestral UTXO tokens of that UTXO token. In some cases, limiting the size of the previous-tokens array to a fixed number of the most recent ancestral UTXO tokens may aid with conserving storage space in the DLTN, in particular when the UTXO token has had a large number of ancestral UTXO tokens and the previous-tokens array grown in size exceedingly large. In some cases, the fixed number of the most recent ancestral UTXO tokens may be configurable. Although the above example is discussed with respect to a particular UTXO token 202g, in some embodiments, the discussion about a UTXO token in the DLTN including information about all ancestral UTXO tokens equally applies to all UTXO tokens in the DLTN.

In some embodiments, the data structure of a UTXO token (e.g., child UTXO token generated from an existing parent UTXO token) in a DLTN may also include a first token identifier identifying the initial UTXO token of the family of UTXO tokens of which that UTXO token is a member. Further, in some embodiments, the data structure of the UTXO token may include a previous-tokens count indicator indicating the number of ancestral UTXO tokens that have been generated since the start of the family of UTXO tokens. For instance, FIG. 2A shows an example UTXO token 202g with a data structure including a first token identifier 208g identifying the genesis UTXO token 202a of the family of UTXO tokens 202a-202h. In some cases, the first token identifier allows one, such as a token administrator, to identify the family of tokens to which a particular UTXO token belongs. Further, the data structure of UTXO token 202g includes a previous-tokens count indicator 212g indicating the number of ancestral UTXO tokens that have existed in the direct lineage from the genesis UTXO token 202a to UTXO token 202g. For example, the previous-tokens count indicator 212g equals three because there are three UTXO tokens in the ancestral line from the genesis UTXO token 202a to UTXO token 202g, i.e., UTXO tokens 202a, 202c and 202d. Although the above example is discussed with respect to a particular UTXO token 202g, in some embodiments, the discussion about a UTXO token in the DLTN including a first token identifier and a previous-tokens count indicator equally applies to all UTXO tokens in the DLTN.

In some embodiments, a novel usage of the data structure of UTXO tokens discussed above and shown in the example embodiments of FIG. 2A may allow for the tracking of UTXO tokens in the DLTN. For example, an entity such as a token administrator that may be tasked with managing transactions that include the transfer of UTXO tokens between accounts on the DLTN may use the information contained in the data structures of UTXO tokens to identify UTXO tokens on the DLTN, and regulate the movement of said UTXO tokens between accounts on the DLTN. In some cases, the DLTN may have a clawback list associated therewith that contains the UTXO tokens identifiers of UTXO tokens that are barred from being transferred between accounts on the DLTN. For instance, such UTXO tokens (i.e., "tainted" UTXO tokens) may have been used for illicit activities on the DLTN or may have originated from or associated with accounts on the DLTN that are used for the illicit activities. In some embodiments, when discovering that a UTXO token is a tainted token, the token administrator may wish to freeze or clawback the UTXO token. In some cases, a UTXO token may be "frozen" on the DLTN by listing the UTXO token (e.g, its UTXO token identifier) in the clawback list so that the UTXO token may not be transferred between accounts on the DLTN.

For example, a participant of a DLTN may request to have a UTXO token transferred on the DLTN, and in such cases, prior to allowing the transfer of the UTXO token, a computing node of the DLTN configured for managing the transfer of UTXO tokens on the DLTN may check (e.g., via a smart contract executing on the computing node) the clawback list for the presence or absence of the UTXO token (e.g., by checking for the presence or absence of the UTXO token identifier of the UTXO token in the clawback list), and block the transfer of the UTXO token if the UTXO token is listed in the clawback list, effectively freezing the UTXO token in the DLTN. In some embodiments, in addition to or instead of freezing tainted tokens, the administrator may clawback the tainted tokens, i.e., when determining that an UTXO token is a tainted token, the token administrator may use its computing node to transfer the tainted token to a tainted-token repository account on the DLTN, for example.

In some embodiments, the clawback list may be stored as a HashMap where the token identifier of a UTXO token may be uniquely associated with the memory address of the memory or storage system where the token identifier may be listed. For instance, if a UTXO token 202c has been identified as a tainted UTXO token and included in the clawback list, the token identifier 204c (i.e., "0x72") may be located at the memory address "0x72". As such, for example, when a smart contract that is configured to manage the transfer of UTXO token transfers between accounts on a DLTN receives a request to effect the transfer of UTXO token 202c, the smart contract may read the UTXO token identifier 204c from the UTXO token 202c, i.e., read "0x72" from UTXO token 202c, and directly navigate to the memory address "0x72" of the memory or storage system storing the clawback list to check if the UTXO token 202c (e.g., its token identifier 204c) is listed in the memory. If the UTXO token 202c is present (e.g., listed) or absent (e.g., unlisted) in the memory, in some cases, the smart contract may block or facilitate the transfer, respectively, as discussed above.

In some embodiments, when discovering that a UTXO token is a tainted token, a token administrator may use the information in the data structure of that UTXO token to identify the descendant UTXO tokens of the UTXO token, for example, to freeze or clawback the descendant UTXO tokens. In some embodiments, the first step in the process of identifying all the descendant UTXO tokens of the tainted UTXO token may be identifying the child UTXO tokens of the tainted UTXO token. In some embodiments, to identify these child UTXO tokens, the token administrator may apply, using a computing node of the DLTN associated therewith, a hashing function or algorithm to the token identifier of the tainted UTXO token and to an index selected from an index list (e.g., first index in an ordered list of indices) to generate a token identifier of the child UTXO token of the tainted UTXO token. The computing node may then check a UTXO HashMap where all the UTXO tokens of the DLTN are stored to determine if there exists a UTXO token with the generated UTXO token identifier. If there is such a UTXO token, the computing node may identify the UTXO token as a child of the tainted UTXO token (e.g., and, for instance, add its UTXO token identifier into the clawback list) and proceed with computing for additional UTXO token identifiers. For instance, the computing node may then increment the index (e.g., select the next index in the ordered list of indices) and apply the hashing function or algorithm to the token identifier of the tainted UTXO token and the incremented index to generate a second token identifier of another child UTXO token of the tainted UTXO token. The computing node may then check the UTXO HashMap to determine if there exists a UTXO token with the generated second UTXO token identifier (e.g., and identify the UTXO token as the second child of the tainted UTXO token if it exists in the UTXO HashMap). The computing node may then repeat the above process while incrementing the index (e.g., or selecting the next index in the list of indices) until the computing node determines that there is no UTXO token stored in the UTXO HashMap that corresponds to a UTXO token identifier generated by applying the hashing function or algorithm to the token identifier of the tainted UTXO token and an incremented index. Because the hash function can be deterministic and can generate the same output for the same input, in some instances, the claw back process can potentially emulate previous token generation processes.

In some embodiments, the computing node may then repeat the above process with each generation of tainted descendant UTXO tokens until there exists no child UTXO token corresponding to a token identifier generated by applying the hashing function or algorithm to a token identifier of a UTXO token in that generation of UTXO tokens and an index. That is, in some instances, the computing node may employ a recursive procedure of calculating child token identifier(s) for each descendant of the tainted UTXO token by incrementing the index used in calculating the child token identifier(s) until the computing node determines that there is no UTXO token stored in the HashMap of the DLTN that has the calculated child token identifier. In such cases, UTXO tokens stored in the HashMap and having UTXO token identifiers calculated by the computing node of the token administrator may be identified as descendant UTXO tokens of the initial tainted UTXO tokens (e.g., the token identifiers may be placed on a clawback list prohibiting their transfers on the DLTN).

In some embodiments, the above process of identifying all the descendants of a tainted UTXO token may be illustrated with reference to UTXO token 202c in FIG. 2A. As an example, if UTXO token 202c is determined to be a tainted token, to identify all the descendants of UTXO token 202c, a computing node (e.g., of the token administrator) may initially apply the hashing function or algorithm to the token identifier 204c of UTXO token 202c and to the first index in an index list (e.g., index=0, the first index in the index list containing ordered whole numbers), i.e., H(0x72, 0)=0x34, to generate a UTXO token identifier 204d of the first child UTXO token 202d of the tainted UTXO token 202c. The computing node may then check the UTXO HashMap to determine that a UTXO token with the UTXO token identifier 0x34 in fact exists therein. In some embodiments, the computing node may proceed with computing H(0x72,i), where i=1, 2, . . . are succeeding indices in the index list until the computing node determines that no UTXO token corresponding to a computed UTXO token identifier exists in the UTXO HashMap. For instance, the computing node may compute H(0x72,1)=0x42, and determine that UTXO token 202e with such UTXO token identifier 204e exists in the HashMap. The computing node may then proceed with computing H(0x72,2) and determine that there is no UTXO token in the UTXO HashMap, in which case the computing node may cease with the computations and identify UTXO tokens 202d, 202e with UTXO token identifiers 204d, 204e (i.e., 0x34 and 0x42) as the only child UTXO tokens of the initial tainted UTXO token 202c.

In some embodiments, the computing node may then repeat the same process with each child UTXO token of the initial tainted UTXO token 202c, i.e., with UTXO tokens 202d and 202e. For instance, the computing node may compute H(0x34,1), where 0x34 is the UTXO token identifier 204d of UTXO token 202d and i=0, 1, 2, . . . . The computing node may determine that UTXO tokens 202f, 202g, 202h with UTXO identifiers H(0x34,0)=0x25, H(0x34,1)=0x91 and H(0x34,2)=0x59 are stored in the UTXO HashMap of the DLTN, but there exists no UTXO token in the UTXO HashMap with a UTXO token identifier corresponding to H(0x34,2). Upon determining that there is no UTXO token in the UTXO HashMap with a UTXO token identifier corresponding to H(0x34,2), in some instances, the computing node may cease computing the hash values (e.g., may not compute H(0x34,i>2)) and identify UTXO tokens 202f, 202g, 202h as the only child UTXO tokens of UTXO tokens 202d. The computing node may then repeat the same process with the other child UTXO token 202e. Further, in some cases, the computing node may then repeat the same process with the child UTXO tokens of the next generation of UTXO tokens, i.e., with the UTXO tokens 202f, 202g, 202h, until the computing node determines that there is no UTXO token in the UTXO HashMap that is a child of these UTXO tokens. In other words, in some instances, starting with a tainted UTXO token (e.g., such as UTXO token 202c), a computing node of a token administrator may recursively compute the hash value H(token_id,index), where token_id is the token identifier of UTXO token 202c and all its descendant UTXO tokens and index is an index selected incrementally from an index list containing indices (e.g., whole numbers, natural numbers, etc.). For a given token_id, the computing node may cease computing H(token_id,index) when H(token_id,index) returns a UTXO token identifier with no corresponding UTXO token in the UTXO HashMap of the DLTN. In some cases, the UTXO tokens stored in the UTXO HashMap and having UTXO token identifiers corresponding to a calculated hash value H(token_id,index) may be identified as descendants of the tainted UTXO token (e.g., and be prohibited from being transferred on the DLTN, for instance, by being included in a clawback list of the DLTN).

In some embodiments, as discussed above, the data structure of a UTXO token may be used to identify all descendant UTXO tokens of that UTXO token. That is, for example, given a tainted UTXO token, the data structure of that UTXO token may be used to identify all descendants of the tainted UTXO tokens. In some embodiments, given a UTXO token, the data structure of that UTXO token may also be used to identify if that UTXO token is related to other tainted UTXO tokens (e.g., UTXO tokens with token identifiers included in a clawback list). For example, a DLTN participant may request, via a computing node of a DLTN, for a UTXO token that is in a first DLTN account to be transferred to a second account on the DLTN as payment for services or product sold ("payment UTXO token"). In such cases, a computing node tasked with handling the transfer request (e.g., the computing node of the DLTN participant or that of the token administrator) may have to verify, prior to allowing the transfer of the payment UTXO token, that the token identifier of the payment UTXO token has not been included in a clawback list in the DLTN or that the payment UTXO token is not a descendant of a UTXO token with a token identifier contained in the clawback list.

In some embodiments, the computing node may check to see if the token identifier of the payment UTXO token has been included in a clawback list of the DLTN. If the token identifier is in fact on the clawback list, in some instances, the computing node may block the transfer of the payment UTXO token (in other words, a UTXO token may be effectively frozen on a DLTN when its UTXO token identifier is included in a clawback list of the DLTN). In some cases, the computing node may be configured to clawback the clawback-listed UTXO token by transferring the UTXO token to a tainted-token repository account on the DLTN. In some instances, however, the token identifier of the payment UTXO token may not be present in the clawback list, and the computing node may then proceed to determining whether the payment UTXO token is a descendant of UTXO token(s) with token identifiers listed in the clawback list.

In some embodiments, the computing node may check to determine if the clawback list contains a token identifier of a UTXO token that has the same first token identifier (i.e., genesis token identifier) as the payment UTXO token. In other words, the computing node may check to determine if the clawback list contains any UTXO token that is spawned from the same genesis UTXO token as that of the payment UTXO token. In some instances, the computing node may determine that there is no such UTXO token in the clawback list, i.e., the family of tokens spawned by the genesis UTXO token and includes the payment UTXO token does not have any UTXO token in the clawback list. In such cases, the computing node may confirm that the payment UTXO token may not be a descendant of UTXO token(s) with token identifiers listed in the clawback list, and allow the transfer of the payment UTXO token to the second DLTN account.

In some embodiments, the computing node may determine the clawback list includes a token identifier of a UTXO token that has the same token identifier as the payment UTXO token. That is, in other words, the computing node may determine that a UTXO token with a token identifier included in the clawback list does share the same genesis UTXO token as that of the payment UTXO token, which may indicate that the payment UTXO token can be (but not necessarily) a descendant of UTXO token(s) with token identifiers listed in the clawback list. In such cases, the computing node may check to see if any of the UTXO token identifiers in the previous-tokens array of the payment UTXO token, which list the token identifiers of the ancestral UTXO tokens of the payment UTXO token, is also listed in the clawback list (e.g., the ancestral UTXO tokens of the payment UTXO token are UTXO tokens that are lineal ancestors of the payment token in the ancestral line from the genesis UTXO token to the payment UTXO token). In some instances, if any of the UTXO token identifiers in the previous-tokens array of the payment UTXO token is also listed in the clawback list, then the computing node may confirm that the payment UTXO token is a descendant of UTXO token(s) with token identifiers listed in the clawback list, and prevent the transfer of the payment UTXO token to the second DLTN account. In some cases, the computing node may then add the token identifier of the payment UTXO token into the clawback list. Further, the computing node may clawback the payment UTXO token by transferring the payment UTXO token to a tainted-token repository account on the DLTN, for instance.

In some embodiments, the above process of determining whether the token identifier of a given UTXO token is present in a clawback list or whether the given UTXO token is a descendant of another UTXO token with a token identifier listed in the clawback list may be illustrated with reference to UTXO token 202g in FIG. 2A. As an example, a computing node at first may check to see whether the clawback list contains a token identifier of a UTXO token that has the same first token identifier (i.e., genesis UTXO token identifier) as that of UTXO token 202g, i.e., the computing node may check to determine whether the clawback list contains a token identifier of a UTXO token that includes a first token identifier that is the same as the first token identifier 208g. In other words, if the clawback list does not contain a token identifier of a UTXO token with PP. 2020-05-30.0 as its "first token" entry, then the computing node may determine that none of the descendants of genesis UTXO token 202a (which has a token identifier of PP.2020-05-30.0) is listed in the clawback list, indicating that UTXO token 202g may not be a descendant of a UTXO token listed in the clawback list.

In some embodiments, the computing node may determine that the clawback list does contain a token identifier of a UTXO token with PP.2020-05-30.0 as its "first token" entry, which may indicate that UTXO token 202g can be (but not necessarily) a descendant of UTXO token(s) with token identifiers listed in the clawback list. For example, if the token identifier of UTXO token 202b is listed in the clawback list, then the clawback list contains a UTXO token 202b with PP.2020-05-30.0 as its "first token" entry, which may not be taken as an indication that UTXO token 202g is a descendant of UTXO token(s) with token identifiers listed in the clawback list (because, in such an example, lineal ancestors of UTXO token 202g, i.e., UTXO tokens 202a, 202c and 202d may not be listed in the clawback list, for instance). However, if the token identifier of UTXO token 202c is listed in the clawback list, then the clawback list contains a UTXO token 202c with PP.2020-05-30.0 as its "first token" entry, which may be taken as an indication that UTXO token 202g is a descendant of a UTXO token 202c with a token identifier listed in the clawback list.

In such cases, the computing node may check to determine if any of the UTXO token identifiers PP.2020-05-30.0, 0x72, 0x34 in the previous-tokens array 210g of UTXO token 202g are listed in the clawback list. In some instances, if any of these UTXO token identifiers is listed in the clawback list, then the computing node may confirm that UTXO token 202g is a descendant of UTXO token(s) with token identifiers listed in the clawback list. In some cases, the computing node may then add the token identifier 204g of the UTXO token 202g into the clawback list.

In some embodiments, as discussed above, the previous-tokens array of a UTXO token may not include UTXO token identifiers of all the ancestral UTXO tokens from a genesis UTXO token to that UTXO token. For instance, the previous-tokens array of a UTXO token may be limited to listing up to a threshold number of the most recent ancestral UTXO tokens (e.g., up to thirty-two of the most recent lineal ancestors of the UTXO token). In such cases, the computing node may at first check if any of the UTXO token identifiers in the previous-tokens array of a given UTXO token are listed in the clawback list. In some instances, if any of these UTXO token identifiers is listed in the clawback list, then the computing node may confirm that that the given UTXO token is a descendant of UTXO token(s) with token identifiers listed in the clawback list. If not, the computing node may then identify the UTXO token in the ancestral line of the given UTXO token with a token identifier that is the same as the first token identifier in the previous-tokens array of the given UTXO token, and check to see if any the UTXO token identifiers in the previous-tokens array of that UTXO token is in the clawback list (e.g., and determine the given UTXO token is a descendant of UTXO token(s) listed in the clawback list if any of these UTXO token identifiers are in fact listed in the clawback list). If not, the computing node may repeat the process recursively until the given UTXO token is a descendant of UTXO token(s) listed in the clawback list or no more UTXO token is left in the family of UTXO tokens to check.

Figure 2B:
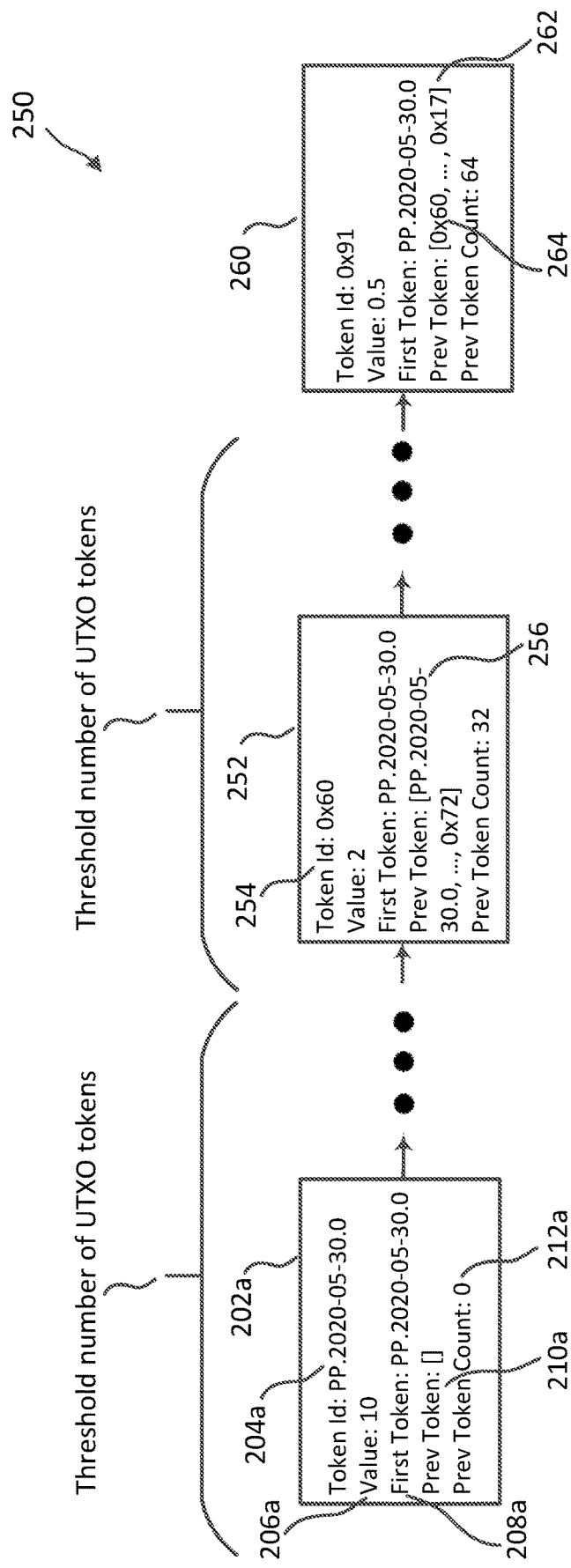

In some embodiments, the above process of determining whether the token identifier of a given UTXO token is present in a clawback list or whether the given UTXO token is a descendant of another UTXO token with a token identifier listed in the clawback list, when the previous-tokens array of that UTXO token is limited to a threshold number of the most recent ancestral UTXO tokens, may be illustrated with reference to UTXO token 260 in FIG. 2B. In FIG. 2B, UTXO token 260 includes a previous-tokens array 262 listing the token identifiers of the most recent threshold number of lineal ancestors (e.g., as opposed to the token identifiers of all lineal ancestors of UTXO token 260 starting from the genesis UTXO token 202a), where the first element 264 in the previous-tokens array 262 is the same as the UTXO token identifier 254 of UTXO token 252 which is the first of the most recent threshold number of lineal ancestors of UTXO token 260. In such cases, after confirming that none of the token identifiers in previous-tokens array 262 of UTXO token 260 is listed in the clawback list, the computing node may then identify the UTXO token 252 that has the same token identifier 254 as the first element 264 in the previous-tokens array 262 of UTXO token 260. The computing node may then check to determine whether any of the token identifiers in the previous-tokens array 256 of that UTXO token 252 is listed in the clawback list. If not, the computing node may recursively continue identifying the UTXO token with the same token identifier as the first element of the last UTXO token checked, and determine whether any of the token identifiers in the previous-tokens array of that UTXO token is listed in the clawback list, until UTXO token 260 is determined to be a descendant of UTXO token(s) listed in the clawback list or no more UTXO token is left in the family of UTXO tokens to check (e.g., the previous-tokens array 210a of UTXO token 202a is empty and as such there is no UTXO token to check that has the same token identifier as the first element of UTXO token 202a).

Figure 3:
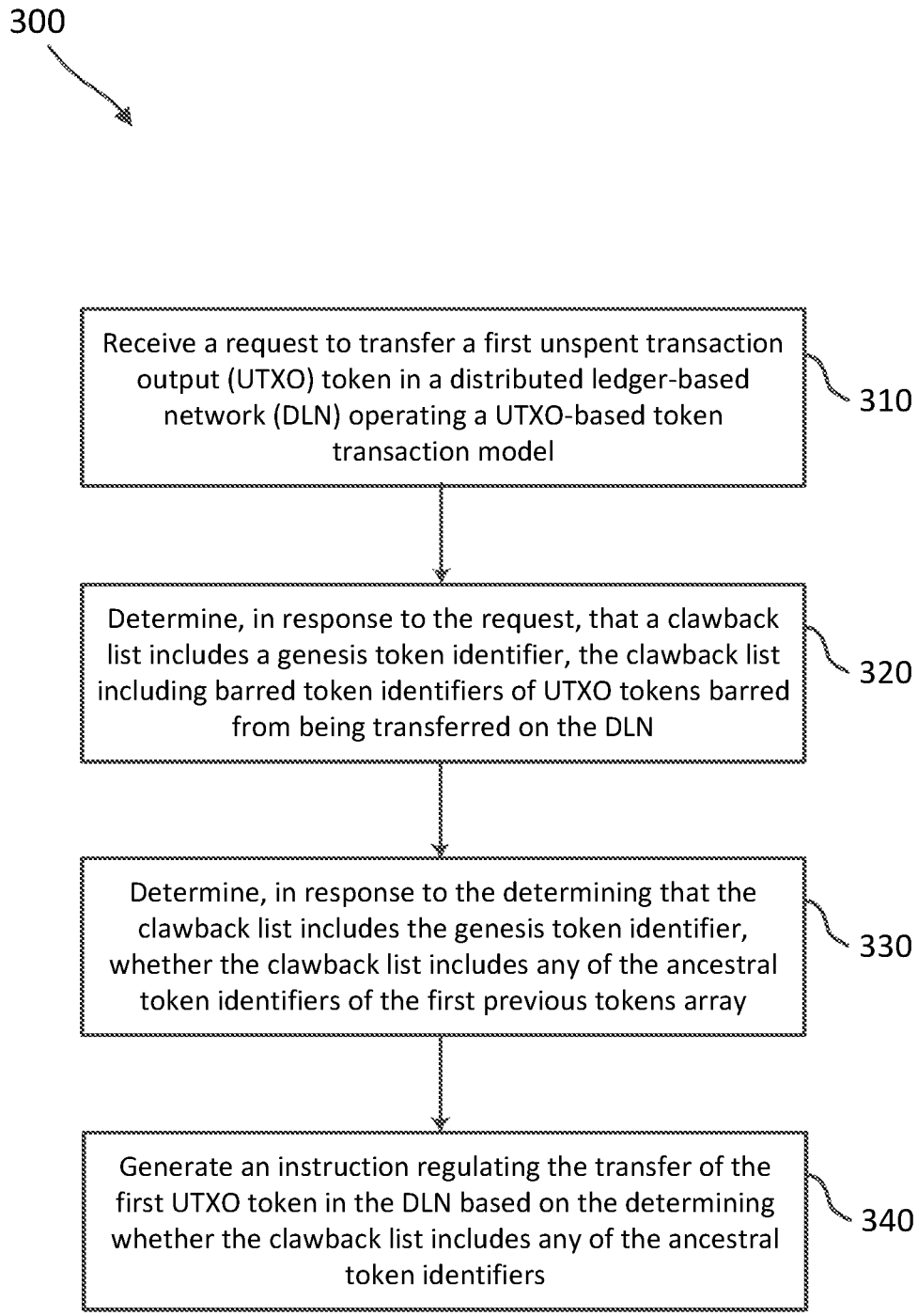
FIG. 3 is a flowchart illustrating a method of managing the transfer of UTXO tokens between accounts on a DLTN, according to various aspects of the present disclosure.

FIG. 3 is a flowchart illustrating a method of managing the transfer of UTXO tokens between accounts on a DLTN, according to various aspects of the present disclosure. The various steps of the method 300, which are described in greater detail above, may be performed by a computer system (e.g., or by processors of such computer systems). In some embodiments, at least some of the steps of the method 300 may be performed by the computing nodes 102a-e and/or the computer system 500. Further, it is understood that additional method steps may be performed before, during, or after the steps 310-340 discussed below. In addition, in some embodiments, one or more of the steps 310-340 may be omitted or performed in different orders.

The method 300 includes a step 310 to receive, at a computer system, a request to transfer a first unspent transaction output (UTXO) token in a distributed ledger technology-based network (DLTN) operating a UTXO-based token transaction model. In some embodiments, the first UTXO token includes a first token identifier that uniquely identifies the first UTXO token, a genesis token identifier that identifies at least one of a genesis UTXO token from which the first UTXO token is descended or a first previous tokens array. In some embodiments, the first previous tokens array includes ancestral token identifiers of a first set of ancestral UTXO tokens that are lineal ancestors of the first UTXO token.

For example, using child UTXO token 202b (FIG. 2A) as an illustrative example of the first UTXO token of method 300, the first UTXO token 202b may include, among other things, a token identifier 204b uniquely identifying the first UTXO token 202b on the DLTN, a genesis token identifier 208b identifying the genesis (i.e., first) token of the family of UTXO tokens 202a-202h, and a previous-tokens array 210b listing the identifiers of the lineal or ancestral UTXO tokens that preceded the first UTXO token 202b.

The method 300 includes a step 320 to determine, via the computer system and in response to the request, that a clawback list includes the genesis token identifier, the clawback list including barred token identifiers of UTXO tokens barred from being transferred on the DLTN. As discussed above, the clawback list contains UTXO tokens identifiers of UTXO tokens that are barred from being transferred between accounts on the DLTN, for instance, for having been used in illicit activities on the DLTN. The clawback list may also include data on other UTXO tokens that are related to barred UTXO tokens.

For example, if the token identifier of a UTXO token is included in a clawback list, the clawback list may also include or list the genesis token identifier of that UTXO token identifying the genesis UTXO token as having spawned a barred UTXO token. Using child UTXO token 202b (FIG. 2A) as an illustrative example, if UTXO token 202b is identified as having been used for illicit activities, for instance, its token identifier 204b may be included in the clawback list, preventing its transfer on the DLTN and as such effectively freezing it on the DLTN. In such cases, the clawback list may also include other data related to UTXO token 202b, such as the genesis token identifier 208b of that UTXO token 202b, the previous-tokens array 210b, the UTXO token amount indicator 206b, and the previous-tokens count indicator 212b, etc.

The method 300 includes a step 330 to determine, via the computer system and in response to the determining that the clawback list includes the genesis token identifier, whether the clawback list includes any of the ancestral token identifiers of the first previous tokens array. That is, with respect to the above example, in response to determining that the clawback list includes the genesis token identifier 208*b*, the method includes the step of determining whether the clawback list includes any of the ancestral token identifiers in the previous-tokens array.

The method 300 includes a step 340 to generate, via the computer system, an instruction regulating the transfer of the first UTXO token in the DLTN based on the determining whether the clawback list includes any of the ancestral token identifiers.

Some embodiments of method 300 further include adding the first UTXO token or a child UTXO token of the first UTXO token into the clawback list if the clawback list is determined to include any of the ancestral token identifiers.

In some embodiments, the first UTXO includes a previous tokens count indicating a number of all ancestral UTXO tokens of the first UTXO token. In some embodiments, a number of the first set of ancestral UTXO tokens is less than the previous tokens count. Further, determining whether the clawback list includes any of the ancestral token identifiers of the first previous tokens array includes determining whether the clawback list includes any token identifier included in a second previous tokens array. In some embodiments, one of the ancestral UTXO tokens of the first UTXO token includes the second previous tokens array and the second previous tokens array contains ancestral UTXO tokens of the one of the ancestral UTXO tokens of the first UTXO token.

In some embodiments, the clawback list is a HashMap relating the barred token identifiers to the UTXO tokens barred from being transferred on the DLTN. In some embodiments, the first token identifier is obtained by hashing a combination of a latest ancestral token identifier of the first previous tokens array and an index. In some embodiments, the first UTXO token is a stablecoin.

In some embodiments, the DLTN includes a first computing node and a second computing node and the request is received from the first computing node requesting to transfer the first UTXO token from the first computing node to the second computing node. In such cases, some embodiments of method 300 further comprise transmitting, by the computer system and to the first computing node, the instruction regulating the transfer to either allow or block the transfer of the first UTXO token from the first computing node to the second computing node when the clawback list is determined to either exclude or include, respectively, any of the ancestral token identifiers of the first previous tokens array.

Some embodiments of the present disclosure include a system that includes a non-transitory memory and one or more hardware processors coupled to the non-transitory memory and configured to read instructions from the non-transitory memory to cause the system to perform operations comprising: receiving, at a computer system, a request to transfer a first unspent transaction output (UTXO) token in a distributed ledger technology-based network (DLTN) operating a UTXO-based token transaction model. In some embodiments, the first UTXO token includes a first token identifier that uniquely identifies the first UTXO token, a genesis token identifier that identifies at least one of a genesis UTXO token from which the first UTXO token is descended or a first previous tokens array including ancestral token identifiers of a first set of ancestral UTXO tokens that are lineal ancestors of the first UTXO token. The operations further comprise determining, via the computer system and in response to the request, that a clawback list includes the genesis token identifier, the clawback list including barred token identifiers of UTXO tokens barred from being transferred on the DLTN. In addition, the operations include determining, via the computer system and in response to the determining that the clawback list includes the genesis token identifier, whether the clawback list includes any of the ancestral token identifiers of the first previous tokens array. The operations also include generating, via the computer system, an instruction regulating the transfer of the first UTXO token in the DLTN based on the determining whether the clawback list includes any of the ancestral token identifiers.

Some embodiments of the present disclosure include a non-transitory machine-readable medium having stored thereon machine-readable instructions executable to cause a machine to perform operations comprising: receiving, at a computer system, a request to transfer a first unspent transaction output (UTXO) token in a distributed ledger technology-based network (DLTN) operating a UTXO-based token transaction model. In some embodiments, the first UTXO token includes a first token identifier that uniquely identifies the first UTXO token, a genesis token identifier that identifies at least one of a genesis UTXO token from which the first UTXO token is descended or a first previous tokens array, the first previous tokens array including ancestral token identifiers of a first set of ancestral UTXO tokens that are lineal ancestors of the first UTXO token. The operations further comprise determining, via the computer system and in response to the request, that a clawback list includes the genesis token identifier, the clawback list including barred token identifiers of UTXO tokens barred from being transferred on the DLTN. In addition, the operations include determining, via the computer system and in response to the determining that the clawback list includes the genesis token identifier, whether the clawback list includes any of the ancestral token identifiers of the first previous tokens array. The operations also include generating, via the computer system, an instruction regulating the transfer of the first UTXO token in the DLTN based on the determining whether the clawback list includes any of the ancestral token identifiers.

Figure 4:
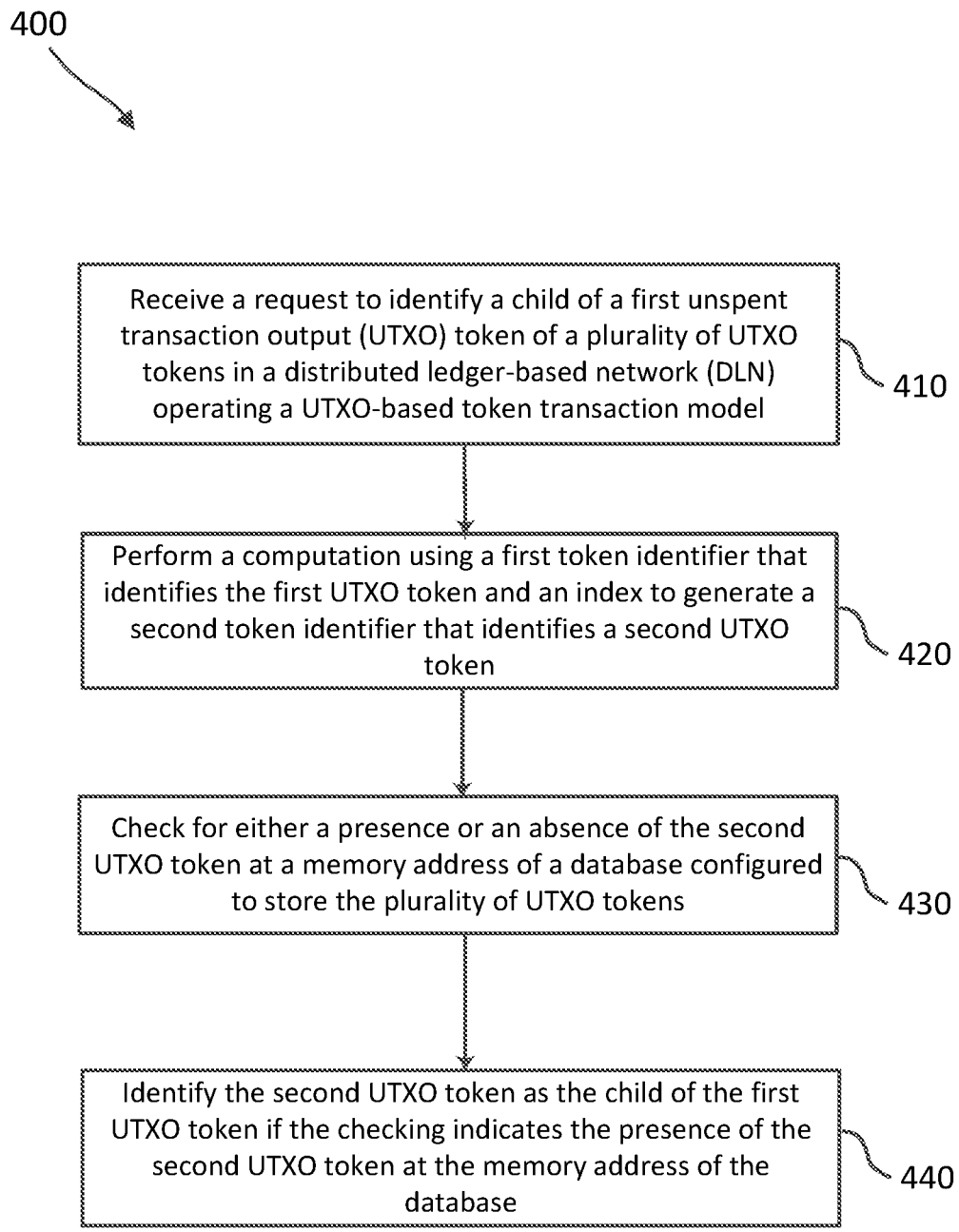
FIG. 4 is a flowchart illustrating a method of identifying a relationship between UTXO tokens on a DLTN, according to various aspects of the present disclosure.

FIG. 4 is a flowchart illustrating a method of identifying a relationship between UTXO tokens on a DLTN, according to various aspects of the present disclosure. The various steps of the method 400, which are described in greater detail above, may be performed by a computer system (e.g., or by processors of such computer systems). In some embodiments, at least some of the steps of the method 400 may be performed by the computing nodes 102*a-e* and/or the computer system 500. Further, it is understood that additional method steps may be performed before, during, or after the steps 410-440 discussed below. In addition, in some embodiments, one or more of the steps 410-440 may be omitted or performed in different orders.

The method 400 includes a step 410 to receive, at a computer system, a request to identify a child of a first unspent transaction output (UTXO) token of a plurality of UTXO tokens in a distributed ledger technology-based network (DLTN) operating a UTXO-based token transaction model. In some embodiments, the first UTXO token including a first token identifier that uniquely identifies the first UTXO token.

The method 400 includes a step 420 to perform, via the computer system, a computation using the first token identifier and an index to generate a second token identifier that identifies a second UTXO token.

The method 400 includes a step 430 to check, via the computer system, for either a presence or an absence of the second UTXO token at a memory address of a database configured to store the plurality of UTXO tokens. In some embodiments, the memory address can be associated with the second token identifier.

The method 400 includes a step 440 to identify, via the computer system, the second UTXO token as the child of the first UTXO token if the checking indicates the presence of the second UTXO token at the memory address of the database.

In some embodiments, the computation includes the computation of a hash function applied to the first token identifier and the index. In some embodiments, a clawback list includes the first UTXO token, wherein the clawback list includes barred token identifiers of UTXO tokens barred from being transferred on the DLTN, and the method further comprising adding the first UTXO token to the clawback list. In some embodiments, the memory address is associated with the second token identifier via a HashMap relating the memory address to the second token identifier. In some embodiments, each of the plurality of UTXO tokens is a stablecoin. Further, some embodiments of method 400 comprise identifying the second UTXO token as not being the child of the first UTXO token if the checking indicates the absence of the second UTXO token at the memory address of the database.

Some embodiments of the present disclosure include a system that includes a non-transitory memory and one or more hardware processors coupled to the non-transitory memory and configured to read instructions from the non-transitory memory to cause the system to perform operations comprising: receiving, at a computer system, a request to identify a child of a first unspent transaction output (UTXO) token of a plurality of UTXO tokens in a distributed ledger technology-based network (DLTN) operating a UTXO-based token transaction model. In some embodiments, the first UTXO token includes a first token identifier that uniquely identifies the first UTXO token. Further, the operations comprise performing, via the computer system, a computation using the first token identifier and an index to generate a second token identifier that identifies a second UTXO token. In addition, the operations comprise checking, via the computer system, for either a presence or an absence of the second UTXO token at a memory address of a database configured to store the plurality of UTXO tokens. In some embodiments, the memory address may be associated with the second token identifier. The operations may further comprise identifying, via the computer system, the second UTXO token as the child of the first UTXO token if the checking indicates the presence of the second UTXO token at the memory address of the database.

Some embodiments of the present disclosure include a non-transitory machine-readable medium having stored thereon machine-readable instructions executable to cause a machine to perform operations comprising: receiving, at a computer system, a request to identify a child of a first unspent transaction output (UTXO) token of a plurality of UTXO tokens in a distributed ledger technology-based network (DLTN) operating a UTXO-based token transaction model. In some embodiments, the first UTXO token includes a first token identifier that uniquely identifies the first UTXO token. Further, the operations comprise performing, via the computer system, a computation using the first token identifier and an index to generate a second token identifier that identifies a second UTXO token. In addition, the operations comprise checking, via the computer system, for either a presence or an absence of the second UTXO token at a memory address of a database configured to store the plurality of UTXO tokens. In some embodiments, the memory address may be associated with the second token identifier. The operations may further comprise identifying, via the computer system, the second UTXO token as the child of the first UTXO token if the checking indicates the presence of the second UTXO token at the memory address of the database.

Figure 5:
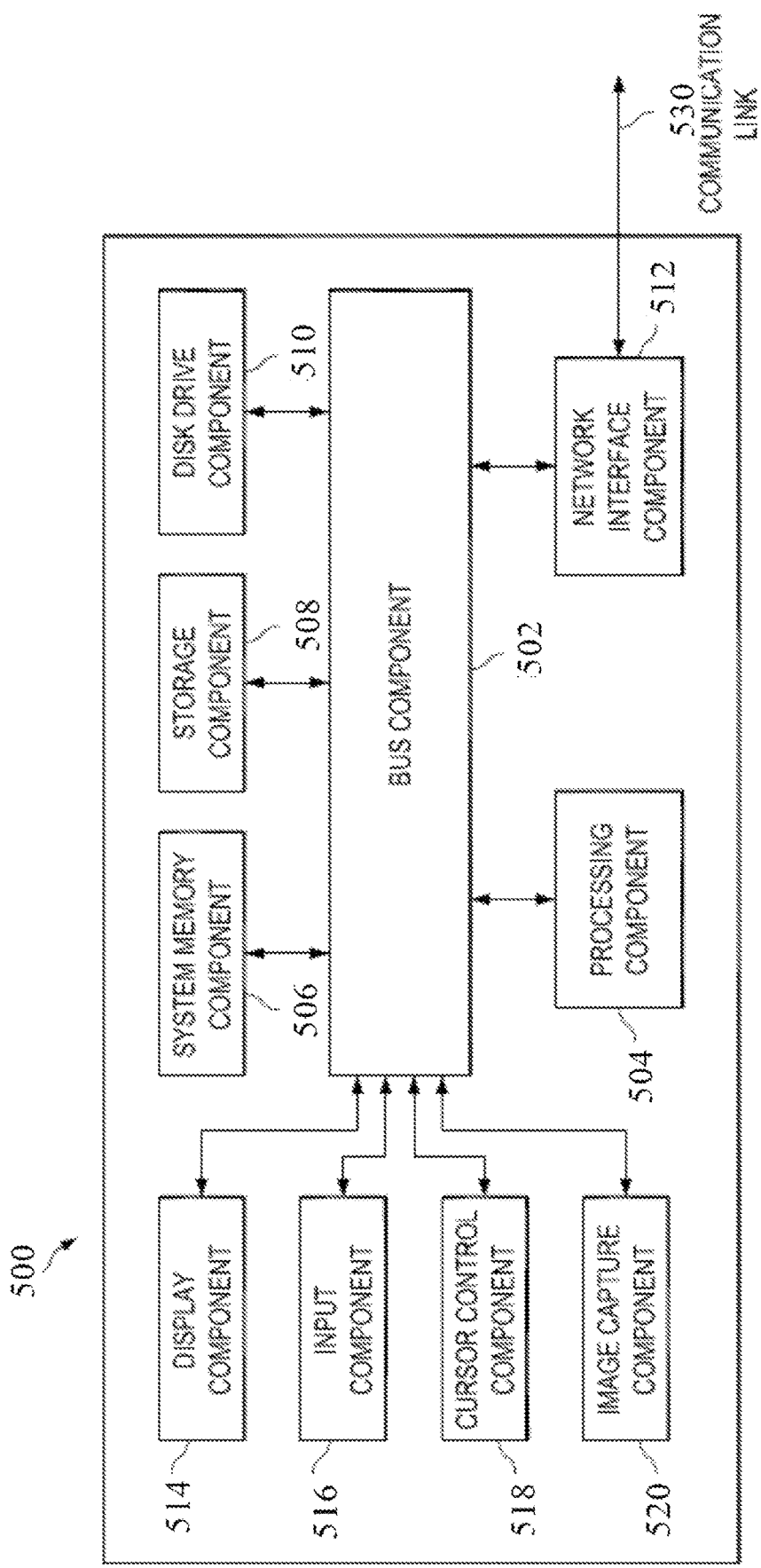
FIG. 5 is an example computer system, according to various aspects of the present disclosure.

FIG. 5 is a block diagram of a computer system 500 suitable for implementing various methods and devices described herein, for example, the computing nodes 102a-102e. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the aforementioned computing nodes, servers or modules, the UTXO tokens 200, and the various method steps of the methods 300 and 400 discussed above may be implemented as the computer system 500 in a manner as follows.

In accordance with various embodiments of the present disclosure, the computer system 500, such as a network server, a mobile communications device, or a computing node (e.g., 102a-102e), includes a bus component 502 or other communication mechanisms for communicating information, which interconnects subsystems and components, such as a computer processing component 504 (e.g., processor, micro-controller, digital signal processor (DSP), graphic processing unit (GPU), central processing unit (CPU), application specific integrated circuit (ASIC), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., cathode ray tube (CRT) or liquid crystal display (LCD)), input component 516 (e.g., keyboard), cursor control component 518 (e.g., mouse or trackball), and image capture component 520 (e.g., analog or digital camera). In one implementation, disk drive component 510 may comprise a database having one or more disk drive components.

In accordance with embodiments of the present disclosure, computer system 500 performs specific operations by the processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of (or in combination with) software instructions to implement the present disclosure. In some embodiments, the methods 300 and 400 may be in the form of software instructions that can be executed by the processor 504 to automatically perform context-appropriate tasks on behalf of a user.

Logic may be encoded in a computer readable medium, which may refer to any medium that participates in providing instructions to the processor 504 for execution. Such a medium may take many forms, including but not limited to, non-volatile media and volatile media. In some embodiments, the computer readable medium is non-transitory. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store UTXO tokens 200 and the programming code for the methods 300 and 400 discussed above.

In various embodiments of the present disclosure, execution of instruction sequences to practice the present disclosure may be performed by computer system 500. In various other embodiments of the present disclosure, a plurality of computer systems 500 coupled by communication link 530 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by computer processor 504 as received and/or stored in disk drive component 510 or some other non-volatile storage component for execution. The communication link 530 and/or the communication interface 512 may be used to conduct electronic communications between the computing nodes 102a-102e of the DLTN 100.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of UTXO token 200 may be implemented as such software code.

Based on the above discussions, the present disclosure offers several significant advantages over conventional methods and systems. It is understood, however, that not all advantages are necessarily discussed in detail herein, different embodiments may offer different advantages, and that no particular advantage is required for all embodiments. One advantage is improved functionality of computing nodes that make up a blockchain network or a distributed ledger technology-based network (DLTN). For example, to clawback a token used for illicit activities in a conventional blockchain network, one may have to search through the history of all transactions (e.g., traversing through a tree structure containing transactions as tree nodes) executed on the blockchain to identify child tokens generated from the tainted tokens, and repeat the same process for each child token until all tokens that are descendants of the original tainted token are identified. Such a process is highly inefficient and may degrade the performance of the computing nodes, and as a result the blockchain network. In contrast, the computer network or system of the present disclosure employs tokens (e.g., UTXO tokens) with data structure that facilitates highly efficient tracking and clawing back of tokens used for transactions (e.g., tainted tokens used for illicit transactions) on the networks or DLTNs. Because, for example, the data structure of the tokens allows for a much reduced traversal of tree structures (e.g., containing transactions as tree nodes) when tracking, and if needed, clawing back tokens, network and computing node performances are significantly improved.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
receiving, at a computer system, a request to transfer a first unspent transaction output (UTXO) token in a distributed ledger technology-based network (DLTN) operating a UTXO-based token transaction model, the first UTXO token including a first token identifier that uniquely identifies the first UTXO token, a genesis token identifier that identifies at least one of a genesis UTXO token from which the first UTXO token is descended or a first previous tokens array, the first previous tokens array including ancestral token identifiers of a first set of ancestral UTXO tokens that are lineal ancestors of the first UTXO token;
determining, via the computer system and in response to the request, that a clawback list includes the genesis token identifier, the clawback list including barred token identifiers of UTXO tokens barred from being transferred on the DLTN;
determining, via the computer system and in response to the determining that the clawback list includes the genesis token identifier, whether the clawback list includes any of the ancestral token identifiers of the first previous tokens array; and generating, via the computer system, an instruction regulating the transfer of the first UTXO token in the DLTN based on the determining whether the clawback list includes any of the ancestral token identifiers.

2. The method of claim 1, further comprising: adding the first UTXO token or a child UTXO token of the first UTXO token into the clawback list if the clawback list is determined to include any of the ancestral token identifiers.

3. The method of claim 1, wherein the first UTXO includes a previous tokens count indicating a number of all ancestral UTXO tokens of the first UTXO token.

4. The method of claim 3, wherein:
a number of the first set of ancestral UTXO tokens is less than the previous tokens count; and
determining whether the clawback list includes any of the ancestral token identifiers of the first previous tokens array includes determining whether the clawback list includes any token identifier included in a second previous tokens array,
one of the ancestral UTXO tokens of the first UTXO token including the second previous tokens array; and
the second previous tokens array containing ancestral UTXO tokens of the one of the ancestral UTXO tokens of the first UTXO token.

5. The method of claim 1, wherein the clawback list is a HashMap relating the barred token identifiers to the UTXO tokens barred from being transferred on the DLTN.

6. The method of claim 1, wherein the first token identifier is obtained by hashing a combination of a latest ancestral token identifier of the first previous tokens array and an index.

7. The method of claim 1, wherein the first UTXO token is a stablecoin.

8. The method of claim 1, wherein:
the DLTN includes a first computing node and a second computing node; and
the request is received from the first computing node requesting to transfer the first UTXO token from the first computing node to the second computing node, the method further comprising:
transmitting, by the computer system and to the first computing node, the instruction regulating the transfer to either allow or block the transfer of the first UTXO token from the first computing node to the second computing node when the clawback list is determined to either exclude or include, respectively, any of the ancestral token identifiers of the first previous tokens array.

9. A non-transitory computer-readable medium (CRM) having stored thereon computer-readable instructions executable to cause a computer system to perform operations comprising:
receiving, at the computer system, a request to transfer a first unspent transaction output (UTXO) token in a distributed ledger technology-based network (DLTN) operating a UTXO-based token transaction model, the first UTXO token including a first token identifier that uniquely identifies the first UTXO token, a genesis token identifier that identifies at least one of a genesis UTXO token from which the first UTXO token is descended or a first previous tokens array, the first previous tokens array including ancestral token identifiers of a first set of ancestral UTXO tokens that are lineal ancestors of the first UTXO token;
determining, via the computer system and in response to the request, that a clawback list includes the genesis token identifier, the clawback list including barred token identifiers of UTXO tokens barred from being transferred on the DLTN;
determining, via the computer system and in response to the determining that the clawback list includes the genesis token identifier, whether the clawback list includes any of the ancestral token identifiers of the first previous tokens array; and
generating, via the computer system, an instruction regulating the transfer of the first UTXO token in the DLTN based on the determining whether the clawback list includes any of the ancestral token identifiers.

10. The non-transitory CRM of claim 9, wherein the operations further comprise:
adding the first UTXO token or a child UTXO token of the first UTXO token into the clawback list if the clawback list is determined to include any of the ancestral token identifiers.

11. The non-transitory CRM of claim 9, wherein the request is received from a first computing node of the DLTN requesting to transfer the first UTXO token from the first computing node to a second computing node of the DLTN, the operations further comprising:
transmitting, by the computer system and to the first computing node, the instruction regulating the transfer to either allow or block the transfer of the first UTXO token from the first computing node to the second computing node when the clawback list is determined to either exclude or include, respectively, any of the ancestral token identifiers of the first previous tokens array.

12. The non-transitory CRM of claim 9, wherein the clawback list is a HashMap relating the barred token identifiers to the UTXO tokens barred from being transferred on the DLTN.

13. The non-transitory CRM of claim 9, wherein the first token identifier is obtained by hashing a combination of a latest ancestral token identifier of the first previous tokens array and an index.

14. The non-transitory CRM of claim 9, wherein the first UTXO token is a stablecoin.

15. A computer system comprising:
a non-transitory memory; and
one or more hardware processors coupled to the non-transitory memory and configured to read instructions from the non-transitory memory to cause the computer system to perform operations comprising:
receiving, at the computer system, a request to transfer a first unspent transaction output (UTXO) token in a distributed ledger technology-based network (DLTN) operating a UTXO-based token transaction model, the first UTXO token including a first token identifier that uniquely identifies the first UTXO token, a genesis token identifier that identifies at least one of a genesis UTXO token from which the first UTXO token is descended or a first previous tokens array, the first previous tokens array including ancestral token identifiers of a first set of ancestral UTXO tokens that are lineal ancestors of the first UTXO token;
determining, via the computer system and in response to the request, that a clawback list includes the genesis token identifier, the clawback list including barred token identifiers of UTXO tokens barred from being transferred on the DLTN;
determining, via the computer system and in response to the determining that the clawback list includes the genesis token identifier, whether the clawback list includes any of the ancestral token identifiers of the first previous tokens array; and generating, via the computer system, an instruction regulating the transfer of the first UTXO token in the DLTN based on the determining whether the clawback list includes any of the ancestral token identifiers.

16. The computer system of claim 15, wherein the operations further comprise:

adding the first UTXO token or a child UTXO token of the first UTXO token into the clawback list if the clawback list is determined to include any of the ancestral token identifiers.

17. The computer system of claim 15, wherein the first UTXO includes a previous tokens count indicating a number of all ancestral UTXO tokens of the first UTXO token.

18. The computer system of claim 15, wherein:

a number of the first set of ancestral UTXO tokens is less than the previous tokens count; and determining whether the clawback list includes any of the ancestral token identifiers of the first previous tokens array includes determining whether the clawback list includes any token identifier included in a second previous tokens array, one of the ancestral UTXO tokens of the first UTXO token including the second previous tokens array; and the second previous tokens array containing ancestral UTXO tokens of the one of the ancestral UTXO tokens of the first UTXO token.

19. The computer system of claim 15, wherein the clawback list is a HashMap relating the barred token identifiers to the UTXO tokens barred from being transferred on the DLTN.

20. The computer system of claim 15, wherein the first token identifier is obtained by hashing a combination of a latest ancestral token identifier of the first previous tokens array and an index.

* * * * *